US007839272B2

(12) United States Patent
Saito

(10) Patent No.: US 7,839,272 B2
(45) Date of Patent: Nov. 23, 2010

(54) VEHICLE SURROUNDINGS MONITORING APPARATUS

(75) Inventor: Toru Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 357 days.

(21) Appl. No.: 12/128,187

(22) Filed: May 28, 2008

(65) Prior Publication Data

US 2008/0309517 A1    Dec. 18, 2008

(30) Foreign Application Priority Data

Jun. 1, 2007    (JP)    ............... 2007-146922

(51) Int. Cl.
*B60Q 1/00*    (2006.01)
*G08G 1/123*    (2006.01)
*H04N 7/18*    (2006.01)

(52) U.S. Cl. .................... 340/435; 340/903; 340/425.5; 348/148; 382/104

(58) Field of Classification Search .................. 340/435
See application file for complete search history.

(56) References Cited

U.S. PATENT DOCUMENTS

| 7,557,858 | B2 * | 7/2009 | Honda et al. ................. 348/362 |
| 7,567,291 | B2 * | 7/2009 | Bechtel et al. .............. 348/370 |
| 2004/0105027 | A1 * | 6/2004 | Kawamura et al. .......... 348/362 |
| 2006/0269271 | A1 * | 11/2006 | Kokel ........................ 396/213 |

FOREIGN PATENT DOCUMENTS

| JP | 5-114099 | 5/1993 |
| JP | 5-265547 | 10/1993 |
| JP | 6-266828 | 9/1994 |
| JP | 7-81459 | 3/1995 |
| JP | 7-225892 | 8/1995 |
| JP | 10-283461 | 10/1998 |
| JP | 10-283477 | 10/1998 |
| JP | 11-139225 | 5/1999 |
| JP | 11-205663 | 7/1999 |
| JP | 2006-072495 | 3/2006 |

* cited by examiner

*Primary Examiner*—Donnie L Crosland
(74) *Attorney, Agent, or Firm*—Smith, Gambrell & Russell, LLP

(57) ABSTRACT

A vehicle surroundings monitoring apparatus includes an image pickup apparatus for taking an image of the surroundings of a vehicle, a preceding-vehicle detecting apparatus for detecting a preceding vehicle from the taken image, a monitored-region setting means for setting predetermined monitored regions around the preceding vehicle on the image, a predicting apparatus for predicting a brightness of an environment the preceding vehicle is going to enter, on the basis of brightnesses of pixels in the monitored regions, and an adjusting apparatus for adjusting at least one of an exposure amount of the image pickup apparatus and the brightnesses of the pixels output from the image pickup apparatus beforehand in accordance with the brightness of the environment predicted by the predicting apparatus.

11 Claims, 13 Drawing Sheets

VEHICLE SURROUNDINGS MONITORING APPARATUS

CROSS-REFERENCE TO RELATED APPLICATIONS

The disclosure of Japanese Patent Application No. 2007-146922 filed on Jun. 1, 2007 including the specification, drawings and abstract is incorporated herein by reference in its entirety.

BACKGROUND OF THE INVENTION

1. Field of the Invention

The present invention relates to vehicle surroundings monitoring apparatuses, and more particularly, to a vehicle surroundings monitoring apparatus capable of controlling the exposure amount of a camera that takes an image of the surroundings of a vehicle in which the apparatus is mounted.

2. Description of the Related Art

In recent years, techniques of detecting objects existing around a vehicle, such as a car, by analyzing an image taken by an image pickup means, such as a charge coupled device (CCD) camera, have been developed (for example, see Japanese Unexamined Patent Application Publication No. 7-225892). These technologies are applied to safe driving technologies for vehicles. For safe driving, for example, the probability of a collision with a detected object is judged, an alarm is given to alert the driver, and automatic steering and automatic brake control are exerted in order to avoid the collision.

In this object detection, it is important to accurately detect obstacles, such as a preceding vehicle, an oncoming vehicle, a pedestrian on the road, and a car parked at the roadside. In order to avoid a collision with a detected obstacle, collision avoidance control is performed. For example, even when the preceding vehicle stops at stop signals, it is not an obstacle, and a driver's own vehicle needs to properly stop behind the preceding vehicle without passing by the preceding vehicle. Since control different from control for other obstacles is required with respect to the preceding vehicle in this way, it is particularly necessary to accurately detect the preceding vehicle.

In order to accurately detect these objects, particularly the preceding vehicle, from an image taken by the image pickup means, the image must be taken by properly performing exposure control in the camera. The image pickup means, such as a CCD camera, normally has this function of automatically performing proper exposure control.

Unfortunately, when the image pickup means takes an image of an environment in which a bright area and a dark area are mixed, for example, when the preceding vehicle enters a tunnel or comes out of the tunnel, that is, when the vehicle having the image pickup means is moving in a bright environment before the tunnel and the inside of the tunnel is dark, the shutter speed is shortened or an iris diaphragm is narrowed in accordance with the bright area during normal automatic exposure control of the image pickup means. For this reason, a taken image of the inside of the tunnel is very dark in general.

When the preceding vehicle enters a dark area, such as the inside of the tunnel, in this state, the preceding vehicle itself becomes dark, and it is difficult to distinguish between the dark surroundings and the dark preceding vehicle. In this case, detection of the preceding vehicle is sometimes impossible. In order to solve this problem, for example, Japanese Unexamined Patent Application Publication No. 7-81459 proposes a car driving control apparatus that adjusts an iris diaphragm of the image pickup means by detecting the brightness of the preceding vehicle itself.

Japanese Unexamined Patent Application Publication No. 11-139225 proposes a vehicle control apparatus that keeps a vehicle in a state suitable for driving in a tunnel. In this apparatus, when the entrance of a tunnel is detected, an air circulation path of an air conditioner in the vehicle is switched to internal recirculation, and the exposure amount of the image pickup means is increased. Japanese Unexamined Patent Application Publication No. 11-205663 proposes an exposure control apparatus that controls the exposure amount of the image pickup means so as to detect a traffic line when a tunnel is detected. In the present invention, continuous lines and broken lines marked on the road surface, for example, a road center line such as a no-passing line, a traffic-lane boundary line, and a separating line for separating a side strip and a roadway, are referred to as traffic lines.

In the apparatus disclosed in Japanese Unexamined Patent Application Publication No. 7-81459, when the preceding vehicle moving in a bright place becomes dark, for example, by happening to enter the shade of a tree, iris control of the image pickup means is performed. However, even if the preceding vehicle itself becomes dark, it can be detected as long as it is bright in front of the preceding vehicle and a boundary between the preceding vehicle and the surroundings can be clearly found on an image taken by the image pickup means. Therefore, in this case, iris control of the image pickup means is unnecessary from the standpoint of accurate detection of the preceding vehicle. It is rather preferable that iris control not be performed in this case, because the control may have an influence on detection of other objects such as traffic lines.

In the apparatus disclosed in Japanese Unexamined Patent Application Publication No. 11-139225, the exposure amount of the image pickup means is controlled as normal automatic exposure control when the vehicle enters the tunnel. Since exposure control is not performed while the vehicle is moving in a bright environment, it is difficult to take an accurate image of the preceding vehicle moving in a dark environment so that the image is distinct from the dark surroundings.

In the apparatus disclosed in Japanese Unexamined Patent Application Publication No. 11-205663, in order to detect a traffic line in both a bright environment before a detected tunnel and a dark environment in the tunnel, the exposure amount of the image pickup means is increased to an upper limit such that the brightness of the traffic line does not become saturated in the bright environment before the tunnel and such that the traffic line can be distinguished from a road surface. However, this exposure amount control is performed strictly for the purpose of detecting the traffic line. It is not certain that this exposure amount control can allow an image of the preceding vehicle in the dark environment in the tunnel to be accurately taken so as to be distinct from the dark surroundings.

Forced exposure control needs to be performed so as to accurately detect the preceding vehicle. However, if forced control is performed independently of normal automatic exposure control by the image pickup means, erroneous detection of objects different from the preceding vehicle may be caused. Therefore, it is preferable to perform automatic control so that forced exposure control is not performed in an unnecessary condition.

SUMMARY OF THE INVENTION

The present invention has been made in view of these circumstances, and an object of the invention is to provide a vehicle surroundings monitoring apparatus that can accurately detect a preceding vehicle by properly performing forced control, such as exposure control, on an image pickup means when the brightness of an environment surrounding the preceding vehicle changes greatly.

In order to solve the above-described problems, a vehicle surroundings monitoring apparatus according to a first aspect of the present invention includes an image pickup means for taking an image of the surroundings of a vehicle; a preceding-vehicle detecting means for detecting a preceding vehicle from the taken image; a monitored-region setting means for setting at least one predetermined monitored region around the preceding vehicle on the image; a predicting means for predicting a brightness of an environment the preceding vehicle is going to enter, on the basis of brightnesses of pixels in the monitored region; and an adjusting means for adjusting at least one of an exposure amount of the image pickup means and the brightnesses of the pixels output from the image pickup means beforehand in accordance with the brightness of the environment predicted by the predicting means.

In this case, the predicting means predicts the brightness of an environment the preceding vehicle is going to enter, on the basis of brightnesses of pixels in the monitored region set around the preceding vehicle on the taken image. For example, when it is predicted that the preceding vehicle is going to go from a bright environment into a dark environment such as the inside of a tunnel, the control level for the exposure amount of the image pickup means and the brightnesses of the pixels output from the image pickup means is forcibly changed beforehand to a control level for the dark environment.

By thus forcibly changing the control level for the exposure amount and the brightness of the output image beforehand from the control level automatically determined by the image pickup means, the contrast in a dark area of the image is improved. Therefore, even when the preceding vehicle enters a dark environment, it can be reliably detected as distinct from the surroundings.

Conversely, when it is predicted that the preceding vehicle is going to go from a dark environment into a bright environment, for example, is going to come out of a tunnel, the control level for the exposure amount of the image pickup means and the brightnesses of the pixels output from the image pickup means is forcibly changed beforehand to a control level for the bright environment. By thus forcibly changing the control level for the exposure amount and the brightness of the output image beforehand, the contrast in a bright area of the image is improved. Therefore, even when the preceding vehicle goes from a dark environment into a bright environment, it can be reliably detected as distinct from the surroundings.

The above-described forced change of the control level for the exposure amount and the brightness of the output image is not performed unless the predicting means predicts that the preceding is going to go from a bright environment into a dark environment or from a dark environment into a bright environment. For this reason, the control level is not forcibly changed except when the brightness of the environment the preceding vehicle is going to enter greatly changes, and an image can be taken with a proper exposure amount based on the control level determined by the image pickup means. This allows automatic control that reliably prevents objects different from the preceding vehicle from being erroneously detected by forcibly change the control level in an unnecessary case.

Preferably, the at least one predetermined monitored region includes a plurality of monitored regions.

By setting a plurality of separate monitored regions around the preceding vehicle on the image, the brightness around the preceding vehicle can be accurately grasped and the brightness of an environment in front of the preceding vehicle can also be reliably grasped, in a manner similar to that adopted, for example, in a case one continuous monitored region is set around the preceding vehicle. Consequently, the above-described advantages of the vehicle surroundings monitoring apparatus can be achieved accurately. Also, since the number of pixels whose brightnesses are to be monitored can be made smaller than in the above-described case, the amount of calculation by the predicting means can be reduced, the processing load on the vehicle surroundings monitoring apparatus can be reduced, and the processing speed can be increased.

Preferably, the plurality of monitored regions are set at least on upper, right, and left sides of the preceding vehicle on the image.

By setting the monitored regions at least on the upper, right, and left sides of the preceding vehicle on the image, the above-described advantages of the vehicle surroundings monitoring apparatus can be achieved properly. Moreover, it is possible to accurately grasp the brightness around the preceding vehicle and the brightness of an environment in front of the preceding vehicle, and to more accurately achieve the above-described advantages of the apparatus.

Preferably, the predicting means predicts that the preceding vehicle is going to enter a dark environment when the brightness of the environment is less than a preset dark threshold value.

By predicting that the preceding vehicle is going to enter a dark environment when the brightness of the environment is less than the preset dark threshold value, it is possible to numerically grasp the change in brightness of the environment, to thereby easily and reliably make the prediction, and to more accurately achieve the above-described advantages of the apparatus.

Preferably, the predicting means predicts that the preceding vehicle is going to enter the dark environment when the brightness of the environment is less than the preset dark threshold value in at least a predetermined number of monitored regions of the at least one monitored region.

By predicting that the preceding vehicle enter the dark environment when the brightness of the environment is less than the preset dark threshold value in at least a predetermined number of monitored regions, it is possible to make the prediction while reliably grasping the change in brightness of the environment, and to more accurately achieve the above-described advantages of the apparatus.

Preferably, the predicting means predicts that the preceding vehicle is going to enter a bright environment when the brightness of the environment is more than a preset bright threshold value.

By predicting that the preceding vehicle is going to enter the bright environment when the brightness of the environment is more than the preset bright threshold value, it is possible to numerically grasp the change in brightness of the environment, to easily and reliably make the prediction, and to more accurately achieve the above-described advantages of the apparatus.

Preferably, the predicting means predicts that the preceding vehicle is going to enter the bright environment when the brightness of the environment is more than the preset bright threshold value in at least a predetermined number of monitored regions of the at least one monitored region.

By predicting that the preceding vehicle is going to enter the bright environment when the brightness of the environment is more than the preset bright threshold value in at least a predetermined number of monitored regions, it is possible to grasp the change in brightness of the environment, to easily and reliably make the prediction, and to more accurately achieve the above-described advantages of the apparatus.

Preferably, the adjusting means makes the adjustment for a dark environment when the predicting means predicts that the preceding vehicle is going to enter the dark environment, and subsequently makes the adjustment for a bright environment when the predicting means predicts that the preceding vehicle is going to enter the bright environment.

For example, when the preceding vehicle enters a tunnel, it enters a dark environment and then goes from the tunnel into a bright environment. For this reason, the adjustment for the dark environment is made when it is predicted that the preceding vehicle is going to enter the dark environment, and the adjustment for the bright environment is then made when it is predicted that the preceding vehicle is going to enter the bright environment. This allows the level of forced control to be changed reliably. Further, since the adjustment for the bright environment is made only when the preceding vehicle temporarily enters the dark environment, the level of forced control is reliably prevented from being changed unnecessarily, and the advantages of the apparatus are achieved more accurately.

Preferably, the adjusting means makes the adjustment until the vehicle passes a current position of the preceding vehicle on the basis of a distance between the vehicle and the preceding vehicle and a speed of the vehicle when the predicting means predicts that the preceding vehicle is going to enter a dark environment or a bright environment.

In this case, the forced control for the dark environment and the forced control for the bright environment can be performed in a limited time. Therefore, the above-described advantages of the apparatus can be achieved more accurately. In particular, the level of forced control can be reliably prevented from being changed in an unnecessary case.

Preferably, the at least one predetermined monitored region includes a region including the preceding vehicle on the image, the predicting means predicts a brightness of the preceding vehicle on the basis of brightnesses of pixels in the region including the preceding vehicle, and the adjusting means makes the adjustment in accordance with the brightness of the environment predicted by the predicting means and the brightness of the preceding vehicle.

In this case, it is possible to determine whether to perform forced control with consideration of not only the brightness of the environment predicted from the monitored region around the preceding vehicle, but also the brightness of the preceding vehicle based on the average brightness of the pixels in the monitored region including the preceding vehicle and the mode of a histogram representing the brightnesses of the pixels. Accordingly, it is possible to reliably detect the preceding vehicle as distinct from the dark and bright surroundings and to thereby determine whether to change the level of forced control. Therefore, the above-described advantages can be achieved more properly. In particular, the level of forced control can be reliably prevented from being changed in an unnecessary case.

DESCRIPTION OF THE PREFERRED EMBODIMENT

A vehicle surroundings monitoring apparatus according to an embodiment of the present invention will be described below with reference to the drawings.

While two cameras serving as an image pickup means 2 take stereo images in this embodiment, the image pickup means 2 may be formed, for example, by a single camera. The structure of an object detecting means 11 serving as a preceding-vehicle detecting means is not limited to a structure adopted in this embodiment as long as the object detecting means 11 can detect a preceding vehicle from a taken image.

Figure 1:
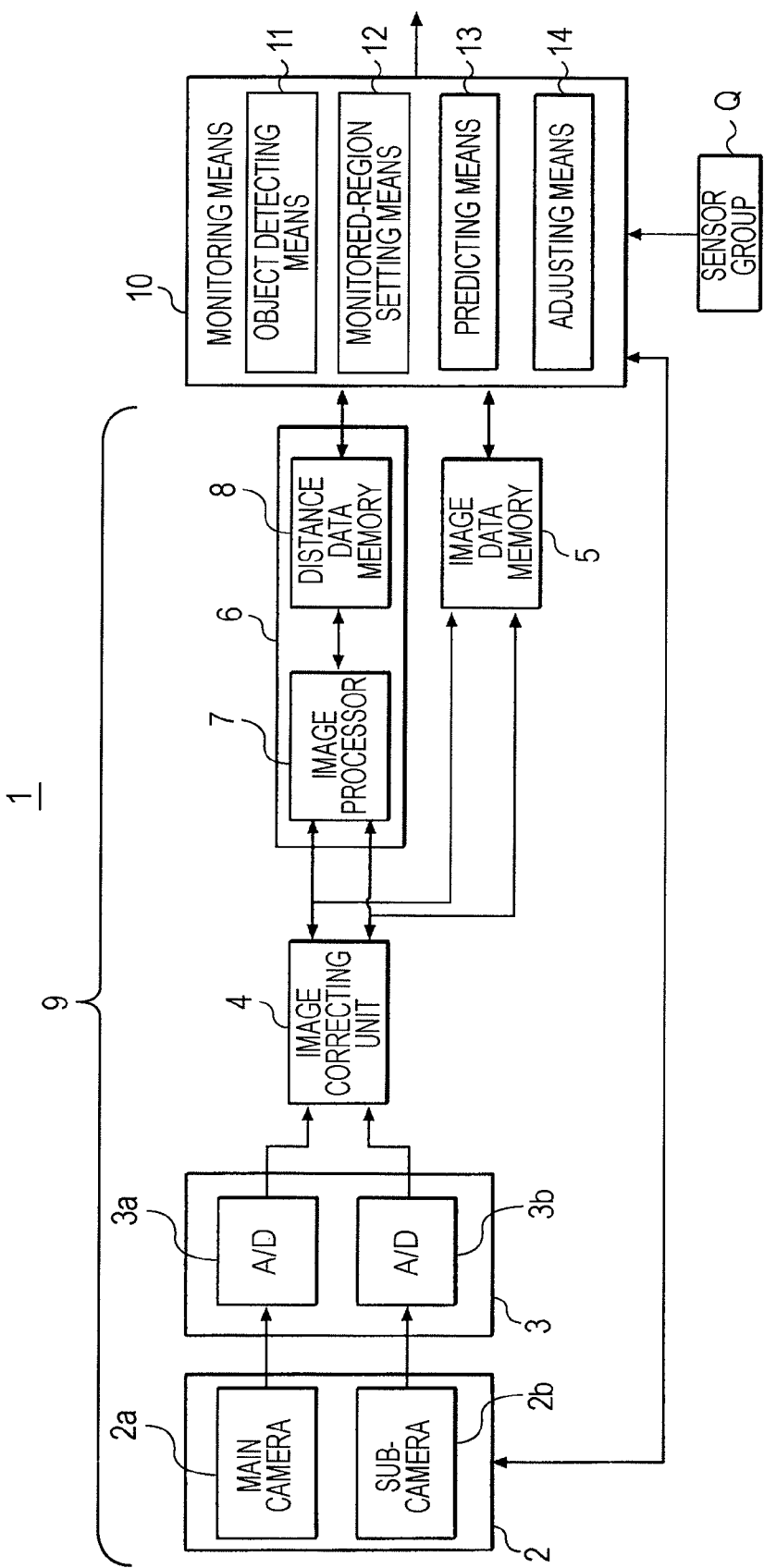
FIG. 1 is a block diagram showing the configuration of a vehicle surroundings monitoring apparatus according to an embodiment of the present invention.

As shown in FIG. 1, a vehicle surroundings monitoring apparatus 1 according to this embodiment mainly includes a positional-information gathering means 9 including the image pickup means 2, a conversion means 3, an image processing means 6, etc., and a monitoring means 10 including an adjusting means 14, etc.

The positional-information gathering means 9 includes the image pickup means 2 for taking images of the surroundings of a vehicle. The positional-information gathering means 9 takes images of objects around the vehicle, and gathers information about the positions of the objects in a real space, including the distances between the vehicle and the objects. In this embodiment, the positional-information gathering means 9 is based on the vehicle surroundings monitoring apparatuses disclosed in Japanese Unexamined Patent Application Publication Nos. 5-114099, 5-265547, 6-266828, 10-283461, 10-283477, and 2006-72495 filed earlier by the present applicant. The positional-information gathering means 9 will be briefly described below.

In the positional-information gathering means 9, a pair of images of the surroundings of the vehicle are taken by a main camera 2a and a sub-camera 2b provided in the image pickup means 2, as shown in FIG. 1. The main camera 2a and the sub-camera 2b are arranged with a fixed interval therebetween in the vehicle width direction. The taken images are converted into digital images by A/D converters 3a and 3b provided in the conversion means 3, and are subjected to image correction, such as removal of displacement and noise and correction of the brightness, by an image correction unit 4. The corrected digital images are stored in an image data memory 5 and are also transmitted to the monitoring means 10.

In this embodiment, two CCD cameras are provided as the main camera 2a and the sub-camera 2b. The CCD cameras normally have functions of judging the brightness around the vehicle and automatically performing exposure control for proper exposure. Herein, exposure control includes at least control of the shutter speed, switching of the amplifier gain, selection of a look-up table (LUT), and conversion of the brightness in accordance with the selection. These control operations are performed comprehensively.

Since the CCD cameras adopted in this embodiment do not have an iris diaphragm, iris diaphragm control will not be described. However, when the image pickup means 2 has another function for exposure control, such as an iris diaphragm, automatic exposure control, including iris diaphragm control, is performed to comprehensively optimize the exposure.

Figure 2:
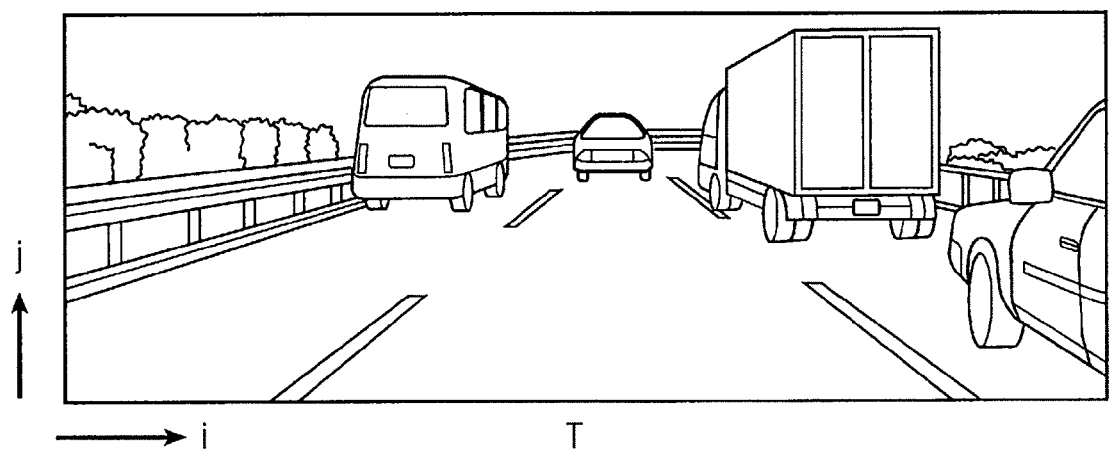
FIG. 2 shows an example of a reference image.

After image correction, the taken images are transmitted to the image processing means 6. An image taken by the main camera 2a, as shown in FIG. 2 (hereinafter referred to as a reference image T) is divided into a plurality of pixel blocks by an image processor 7. Correspondingly to the pixel blocks, pixel blocks of the image taken by the sub-camera 2a are found by stereo matching, and a parallax is calculated for each pixel block. A method for calculating the parallax has been described in detail in the above-described publications.

The parallax can be associated with the position in the real space according to the principle of triangulation. More specifically, the relationships among the points X, Y, and Z in the real space, the parallax dp, and the coordinates (i, j) of a pixel block on the reference image T can be given by the following expressions:

$$X = CD/2 + Z \times PW \times (i - IV) \tag{1}$$

$$Y = CH + Z \times PW \times (j - JV) \tag{2}$$

$$Z = CD/(PW \times (dp - DP)) \tag{3}$$

where a point on the road surface just below the midpoint between the main camera 2a and the sub-camera 2b is designated as the origin, the X-axis indicates the width direction, that is, the right-left direction of the vehicle, the Y-axis indicates the vehicle height direction, and the Z-axis indicates the vehicle length direction, that is, the distance direction.

Herein, CD represents the distance between the main camera 2a and the sub-camera 2b, PW represents the viewing angle for one pixel, CH represents the mounting height of the main camera 2a and the sub-camera 2b, IV and JV respectively represent i and j coordinates of the point at infinity in front of the vehicle, and DP represents the offset amount that is also called a vanishing point parallax.

Figure 3:
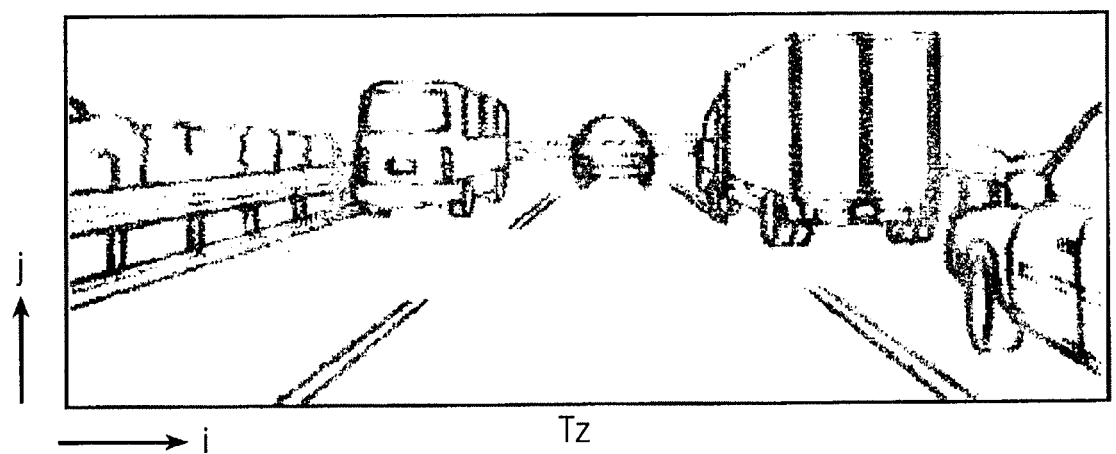
FIG. 3 shows a distance image formed on the basis of the reference image shown in FIG. 2.

The image processing means 6 assigns parallaxes dp to the pixel blocks in the reference image T, stores the parallaxes dp in a distance data memory 8, and transmits information about the parallaxes dp to the monitoring means 10. Hereinafter, an image formed by the pixel blocks with the assigned parallaxes dp on the reference image T will be referred to as a distance image Tz. The distance image Tz is image-like data in which the parallaxes dp are respectively assigned to the pixel blocks, as shown in FIG. 3.

Alternatively, the distance Z between the vehicle including the monitoring apparatus and a preceding vehicle can be measured, for example, with a radar that irradiates the front of the vehicle with laser light or infrared light and measures the distance Z to an object on the basis of information about reflected light from the front of the vehicle. The method for gathering information about the position of the object is not limited to specific methods.

The monitoring means 10 is a computer in which a CPU, a ROM, a RAM, an input/output interface, etc. that are not shown are connected to a bus. The monitoring means 10 is connected to a sensor group Q including a vehicle speed sensor, a yaw-rate sensor, and a steering angle sensor for measuring the steering angle of the steering wheel. The yaw-rate sensor may be replaced with a device for estimating the yaw rate from, for example, the speed of the vehicle.

As shown in FIG. 1, the monitoring means 10 includes an object detecting means 11, a monitored-region setting means 12, a predicting means 13, an adjusting means 14, and a memory (not shown). Necessary data is input from the sensor group Q to the means in the monitoring means 10.

The object detecting means 11 detects objects from the reference image T taken by the image pickup means 2. The object detecting means 11 is the essential part of the vehicle surroundings monitoring apparatus 1 according to this embodiment.

The object detecting means 11 also serves as a preceding-vehicle detecting means. The object detecting means 11 detects objects from the reference image T, estimates a locus that the vehicle is going to form during further traveling (hereinafter referred to as a traveling locus) on the basis of the behavior of the vehicle, and detects a preceding vehicle from the detected objects on the basis of the traveling locus. In this embodiment, the object detecting means 11 is based on the vehicle surroundings monitoring apparatuses disclosed in the above-described publications. The object detecting means 11 will be briefly described below.

In an object detecting operation, the object detecting means 11 first divides the distance image Tz shown in FIG. 3 into vertical strip sections each having a predetermined width, forms a histogram related to parallaxes dp provided above the road surface, of parallaxes included in each section, and sets the mode of the histogram as a parallax dp of the section. This operation is performed for all sections. While only objects existing above the road surface are thus detected in this embodiment, signs provided on the road surface, such as traffic lines, can be detected simultaneously or separately.

Figure 4:
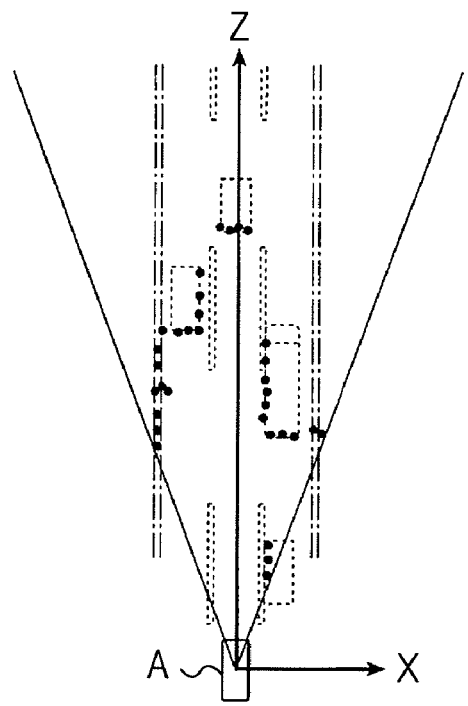
FIG. 4 shows dots formed by plotting distances in sections in a rear space.

On the basis of the parallaxes dp of the sections, the object detecting means 11 calculates the coordinates (X, Y, Z) of the objects in the real space by using the above-described expressions (1) to (3). When the calculated coordinates of the objects are plotted in the real space, they are plotted as dots with some variations in portions of forward objects facing a vehicle A in which the monitoring apparatus 1 is mounted, as shown in FIG. 4.

Figure 5:
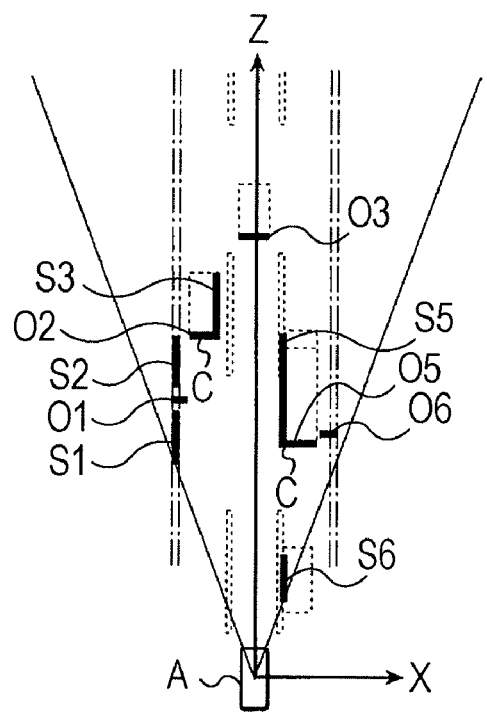
FIG. 5 shows objects detected in the real space on the basis of the dots shown in FIG. 4.

The object detecting means 11 searches for the distances from each of the dots plotted in the real space to the adjacent dots in the X- and Z-axis directions and the total length in the X-axis direction between the leftmost dot to the rightmost dot in a group into which the dots are classified. Then, the object detecting means 11 classifies dots having values within set threshold ranges into groups, and subjects the dots in the groups to collinear approximation so as to detect objects, as shown in FIG. 5.

Figure 6:
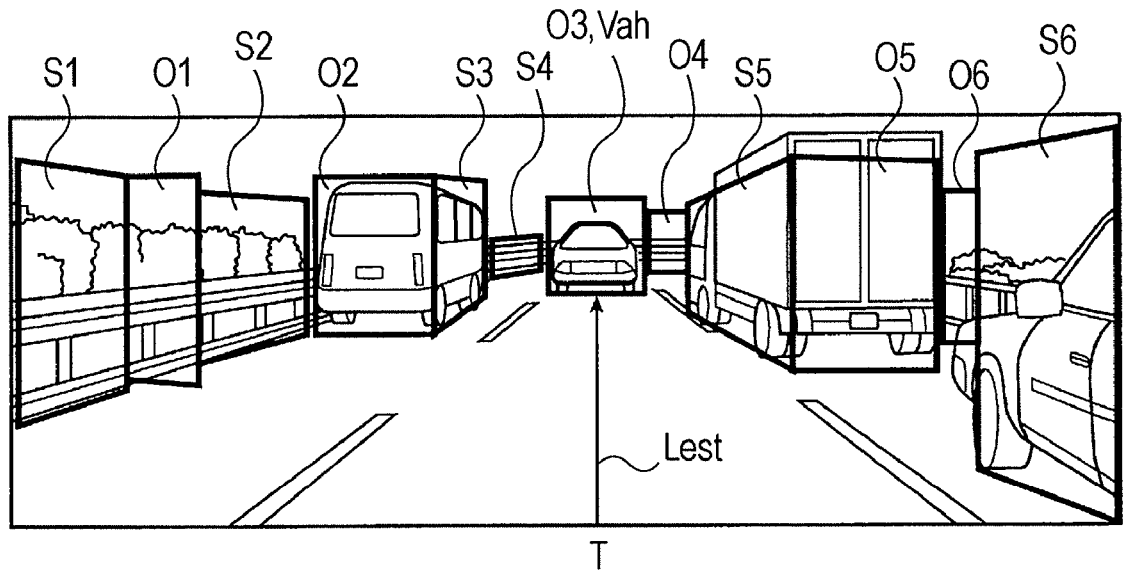
FIG. 6 shows detected objects and preceding vehicles enclosed by frames on the reference image.
Figure 7:
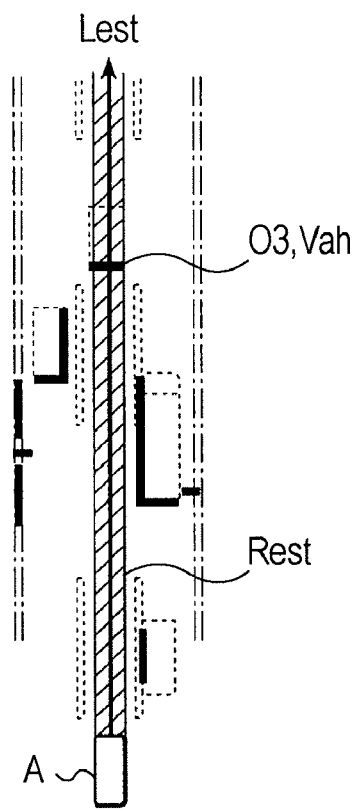
FIG. 7 shows a traveling locus and a traveling path of a vehicle and a preceding vehicle in the real space.

In this embodiment, the objects thus detected by the object detecting means 11 are enclosed by rectangular frames on the reference image T, as shown in FIG. 6. In FIGS. 5 to 7, labels O and S represent the types of faces of the objects facing the vehicle A. Label O shows that a rear face of an object is detected, and label S shows that a side face of the object is detected.

In the next operation of detecting the preceding vehicle, the object detecting means 11 first estimates, as a traveling locus Lest, a locus that the vehicle A is going to form during future driving, on the basis of the behavior of the vehicle A, as shown in FIG. 7. Then, the object detecting means 11 calculates, as a traveling path Rest, a region having a width equal to the width of the vehicle A and centered on the traveling locus Lest. The traveling locus Lest of the vehicle A can be calculated from the turning curvature Cua of the vehicle A. The turning curvature Cua is calculated according to the following expression (4) or the following expressions (5) and (6) on the basis of the vehicle speed V of the vehicle A, the yaw rate, the steering angle δ of the steering wheel, etc:

$$Cua = \gamma/V \quad (4)$$

$$Re = (1 + Asf \cdot V^2) \cdot (Lwb/\delta) \quad (5)$$

$$Cua = 1/Re \quad (6)$$

where Re represents the turning radius, Asf represents the stability factor of the vehicle, and Lwb represents the wheel base.

Then, the object detecting means 11 detects, as a preceding vehicle, an object closest to the vehicle A from the objects existing on the traveling path Rest of the vehicle A. For example, in FIGS. 6 and 7, a car O3 is detected as a preceding vehicle Vah.

In this embodiment, the object detecting means 11 chases the preceding vehicle while ensuring consistency, for example, by calculating the probability that a preceding vehicle detected in the previous sampling period and a preceding vehicle detected in the present sampling period are the same three-dimensional object. Further, the object detecting means 11 can detect the exchange between preceding vehicles, for example, when a detected preceding vehicle comes out of the front of the vehicle A and a vehicle in front of the detected vehicle becomes a new preceding vehicle, or when another vehicle cuts in between the vehicle A and the preceding vehicle so as to become a new preceding vehicle.

On the reference image T, the monitored-region setting means 12 sets predetermined monitored regions around the preceding vehicle detected by the object detecting means 11 and including an image area in which an image in front of the preceding vehicle is taken.

Figure 8:
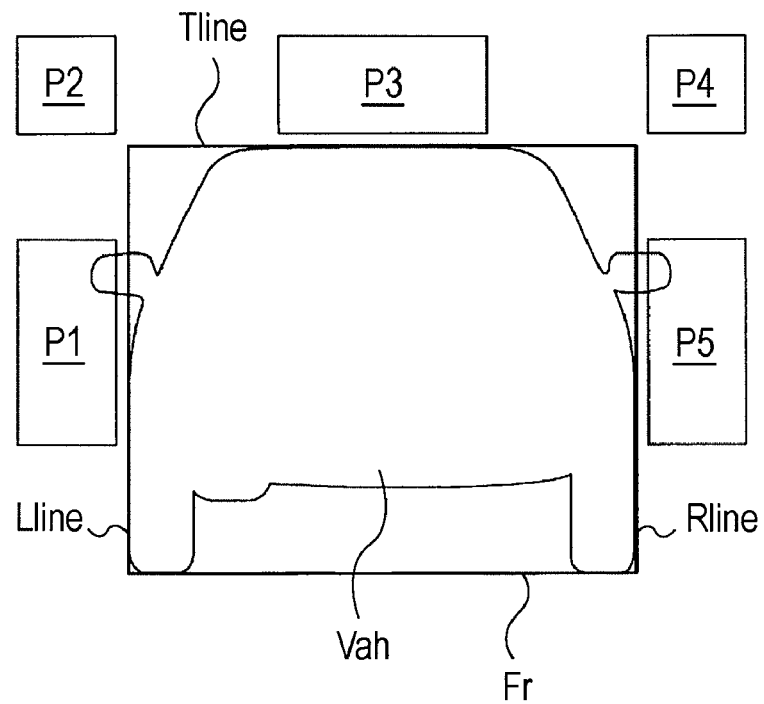
FIG. 8 explains monitored regions set around the preceding vehicle.

As described above, the preceding vehicle detected by the object detecting means 11 is enclosed by a rectangular frame on the reference image T. The monitored-region setting means 12 sets monitored regions P1 and P5 at five positions on the, upper, right, and left sides and obliquely upper left and right sides of a frame Fr that encloses the preceding vehicle Vah on the reference image T, as shown in FIG. 8.

In order to more reliably grasp the brightness of the environment in front of the preceding vehicle, it is preferable that monitored regions be set at least on the upper, right, and left sides of the preceding vehicle on the image. While a plurality of monitored regions are set mainly to reduce the amount of calculation by the below-described predicting means 13 in this embodiment, a single monitored region may be set around the preceding vehicle Vah.

The monitored regions do not always need to be rectangular as in this embodiment, and the shape thereof may be determined arbitrarily. Further, the monitored regions do not always need to be set outside a top line Tline, a left line Lline, and a right line Rline of the frame Fr enclosing the preceding vehicle Vah, and may be in contact with these lines or may cross the lines.

The predicting means 13 predicts the brightness of an environment that the preceding vehicle Vah is going to enter, on the basis of the brightnesses of the pixels in the monitored regions P1 to P5 that are set on the reference image T by the monitored-region setting means 12 and include images of a landscape in front of the preceding vehicle Vah.

Figure 9:
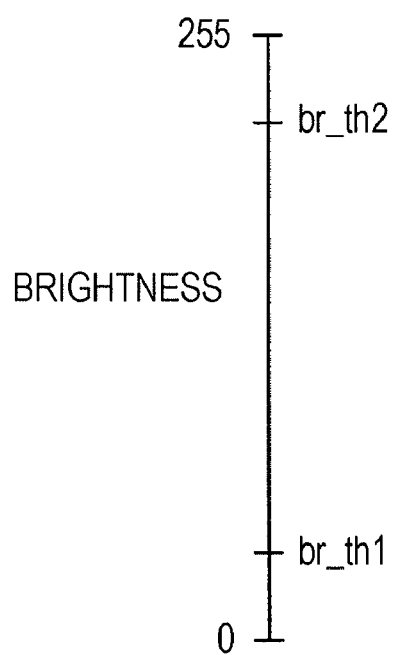
FIG. 9 explains a dark threshold value set in a low brightness region and a bright threshold value set in a high brightness region.

More specifically, in the predicting means 13 of this embodiment, two brightness threshold values, that is, a dark threshold value br_th1 set in a low brightness region and a bright threshold value br_th2 set in a high brightness region, are preset for the brightness of each pixel that is expressed, for example, in 256 gradation levels of 0 to 255, as shown in FIG. 9. For each of the monitored regions P1 to P5, the predicting means 13 counts the number of pixels having brightnesses lower than the dark threshold value br_th1 and the number of pixels having brightnesses higher than the bright threshold value br_th2.

When the number of pixels having brightnesses lower than the dark threshold value br_th1 or the ratio of this number to the total number of pixels in each of the monitored regions P1 to P5 is more than or equal to a preset threshold value th1, the predicting means 13 predicts that the preceding vehicle Vah is going to enter a dark environment having a brightness lower than the preset dark threshold value br_th1.

Figure 10:
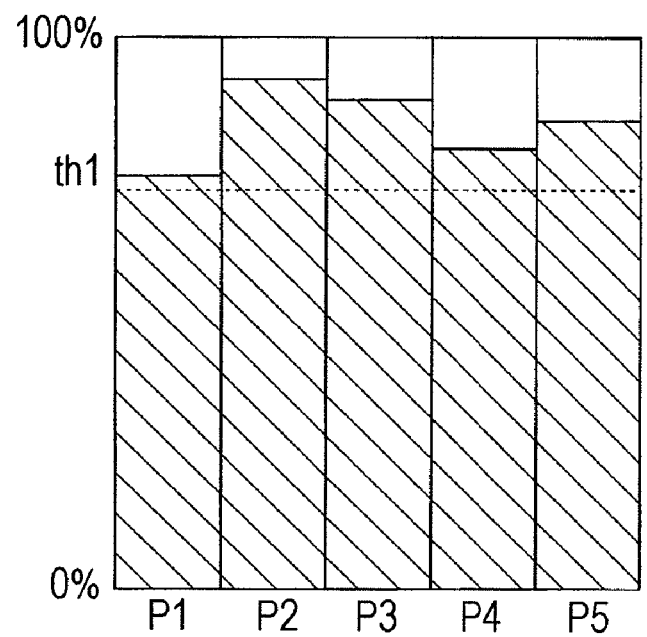
FIG. 10 is a graph showing a state in which the ratio of pixels having brightnesses lower than the dark threshold value is higher than or equal to a threshold value in all monitored regions.

In this embodiment, when the number of pixels having brightnesses lower than the dark threshold value br_th1 is larger than or equal to the threshold value th1 in all the monitored regions P1 to P5, as shown in FIG. 10, the predicting means 13 predicts that the preceding vehicle Vah is going to enter a dark environment. FIG. 10 shows, as an example, the relationship between the ratio of the pixels having brightnesses lower than the dark threshold value br_th1 and the threshold value th1 set for the ratio.

When the number of pixels having brightnesses higher than the bright threshold value br_th2 or the ratio of this number to the total number of pixels in each of the monitored regions P1 to P5 is more than or equal to a preset threshold value th2, the predicting means 13 predicts that the preceding vehicle Vah is going to enter a bright environment having a brightness higher than the preset bright threshold value br_th2.

Figure 11:
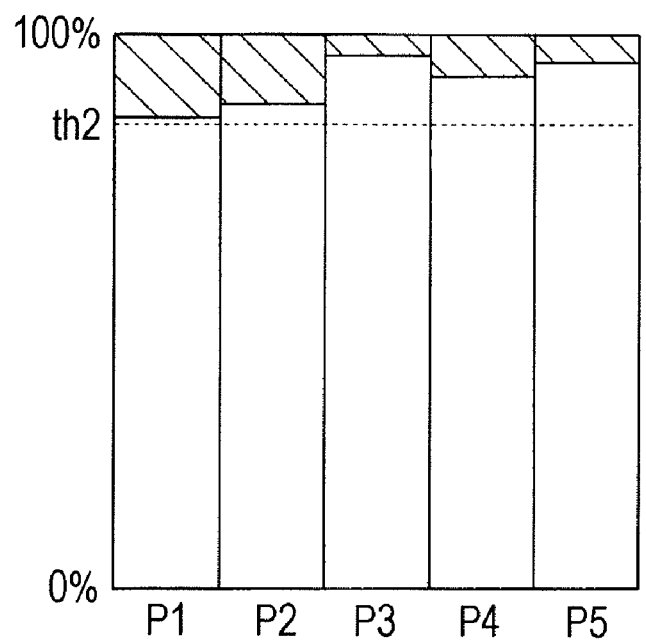
FIG. 11 is a graph showing a state in which the ratio of pixels having brightnesses higher than the bright threshold value is higher than or equal to a threshold value in all monitored regions.

In this embodiment, when the number of pixels having brightnesses higher than the bright threshold value br_th2 is larger than or equal to the threshold value th2 in all the monitored regions P1 to P5, as shown in FIG. 11, the predicting means 13 predicts that the preceding vehicle Vah is going to enter a bright environment. FIG. 11 shows, as an example, the relationship between the ratio of the pixels having brightnesses higher than the bright threshold value br_th2 and the threshold value th2 set for the ratio.

The threshold values th1 and the2 preset for the number of pixels or the ratio may be equal or different, or may be different among a plurality of monitored regions P1 to P5. While it is predicted that the preceding vehicle Vah is going to enter a dark or bright environment when all the monitored regions P1 to P5 satisfy the above-described condition in this embodiment, as described above, the prediction may be made when at least a predetermined number of monitored regions, of the monitored regions P1 to P5, satisfy the above condition.

In accordance with the brightness of the environment predicted by the predicting means 13, into which the preceding vehicle Vah is going to go, the adjusting means 14 outputs, to the image pickup means 2, a signal for adjusting at least one of the exposure amount of the image pickup means 2 and the pixel brightness output from the image pickup means 2. A detailed procedure for the adjustment will be described below.

According to the signal from the adjusting means 14, the image pickup means 2 controls the shutterspeed, switches the amplifier gain, selects a LUT, and converts the brightness on the basis of the LUT. When the image pickup means 2 has an iris diaphragm, the iris diaphragm is adjusted, and forced exposure control different from the above-described automatic exposure control is performed.

The procedure performed by the object detecting means 11 to the adjusting means 14 in the monitoring means 10 will be described below with reference to FIGS. 12 and 13 serving as flowcharts. Also, the operation of the vehicle surroundings monitoring apparatus 1 according to the embodiment will be described.

In an initial state, a flag F, a control distance CR, a timer Ta, and a timer Tb that will be described below are set at 0.

When the objecting detecting unit 11 serving as the preceding-vehicle detecting means detects a preceding vehicle Vah by the above-described method (Step S1; YES), the preceding vehicle Vah is enclosed by a rectangular frame Fr on a reference image T, as shown in FIG. 8 (Step S2 in FIG. 12). Subsequently, the monitored-region setting means 12 sets monitored regions P1 to P5 around the frame Fr enclosing the preceding vehicle Vah on the reference image T (Step S3).

The predicting means 13 counts the number of pixels having brightnesses lower than the dark threshold value br_th1 and the number of pixels having brightnesses higher than the bright threshold value br_th2 in each of the monitored regions P1 to P5. The predicting means 13 then determines whether the number of pixels having brightnesses lower than the dark threshold value br_th1 is more than or equal to a preset threshold value th1, thereby determining whether the preceding vehicle Vah is going to enter a dark environment (Step S4). As described above, determination may be performed on the basis of the ratio of the number of pixels having brightnesses lower than the dark threshold value br_th1 to the total number of pixels in each of the monitored regions. Simultaneously, the predicting means 13 counts the number of pixels having brightnesses higher than the bright threshold value br_th2 in each of the monitored regions P1 to P5.

For example, in a case shown in FIG. 6, it is bright around the preceding vehicle Vah, and the number of pixels having brightnesses lower than the dark threshold value br_th1 in the monitored regions (not shown in FIG. 6) is not larger than or equal to the threshold value th1. Therefore, the predicting means 13 predicts that the preceding vehicle Vah is going to not enter a dark environment (Step S4; NO).

Figure 14:
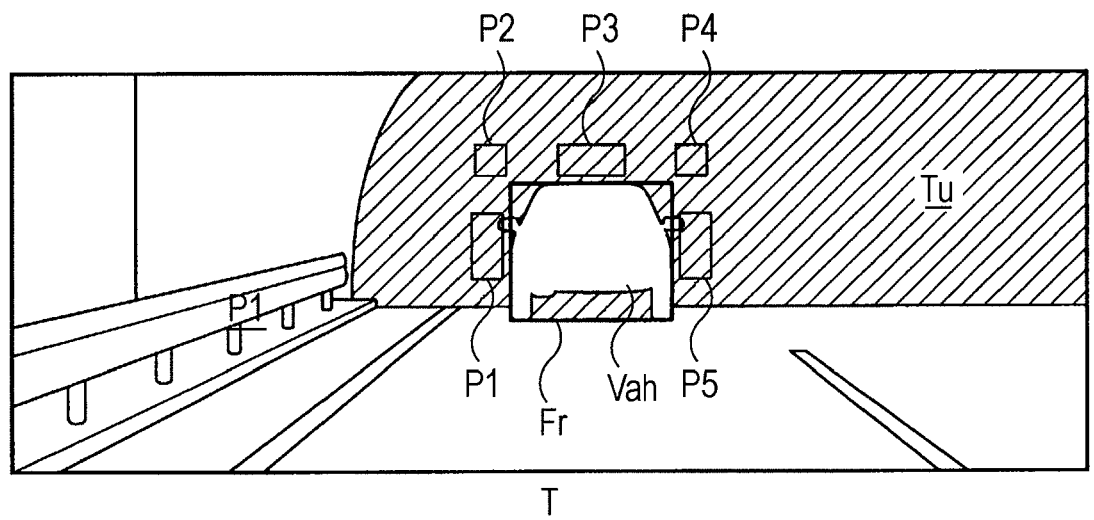
FIG. 14 shows a preceding vehicle reaching the entrance of a tunnel and monitored regions.

In contrast, when the preceding vehicle Vah is arriving at the entrance of a tunnel Tu, as shown in FIG. 14, the number of pixels having brightnesses lower than the dark threshold value br_th1 in the monitored regions P1 to P5 is larger than or equal to the threshold value th1. Therefore, the predicting means 13 predicts that the preceding vehicle Vah is going to enter a dark environment (Step S4 in FIG. 12; YES).

When the predicting means 13 predicts that the preceding vehicle Vah is going to enter the dark environment and the flag F is not set at 1 (Step S5; NO), the adjusting means 14 sets the flag F at 1 (Step S6), and sets the control distance CR at, for example, 10 km (Step S7). The control distance CR is decreased every sampling period, as will be described below (see Step S17 in FIG. 13). The flag F and the control distance CR will be described below.

Subsequently, the adjusting means 14 sets an open signal as a signal S to be output to the image pickup means 2 (Step S8 in FIG. 12). The image pickup means 2 checks the brightness around the vehicle A, and determines the control level of the exposure amount, or determines the control level of the pixel brightness to be output from the image pickup means 2. In this way, the signal S is used to further forcibly change the control level automatically determined by the image pickup means 2.

The open signal S means that the control level is forcibly changed to a level for an environment darker than the ambient brightness determined by the image pickup means 2. When the signal S is a close signal that will be described below, it means that the control level is forcibly changed to a level for an environment brighter than the ambient brightness determined by the image pickup means 2.

Further, the adjusting means 14 sets the timer Ta (Step S9). The timer Ta is set to define an upper limit for the duration of forced control by the adjusting means 14 so that the forced control for the image pickup means 2 does not continue for a period longer than necessary.

Figure 12:
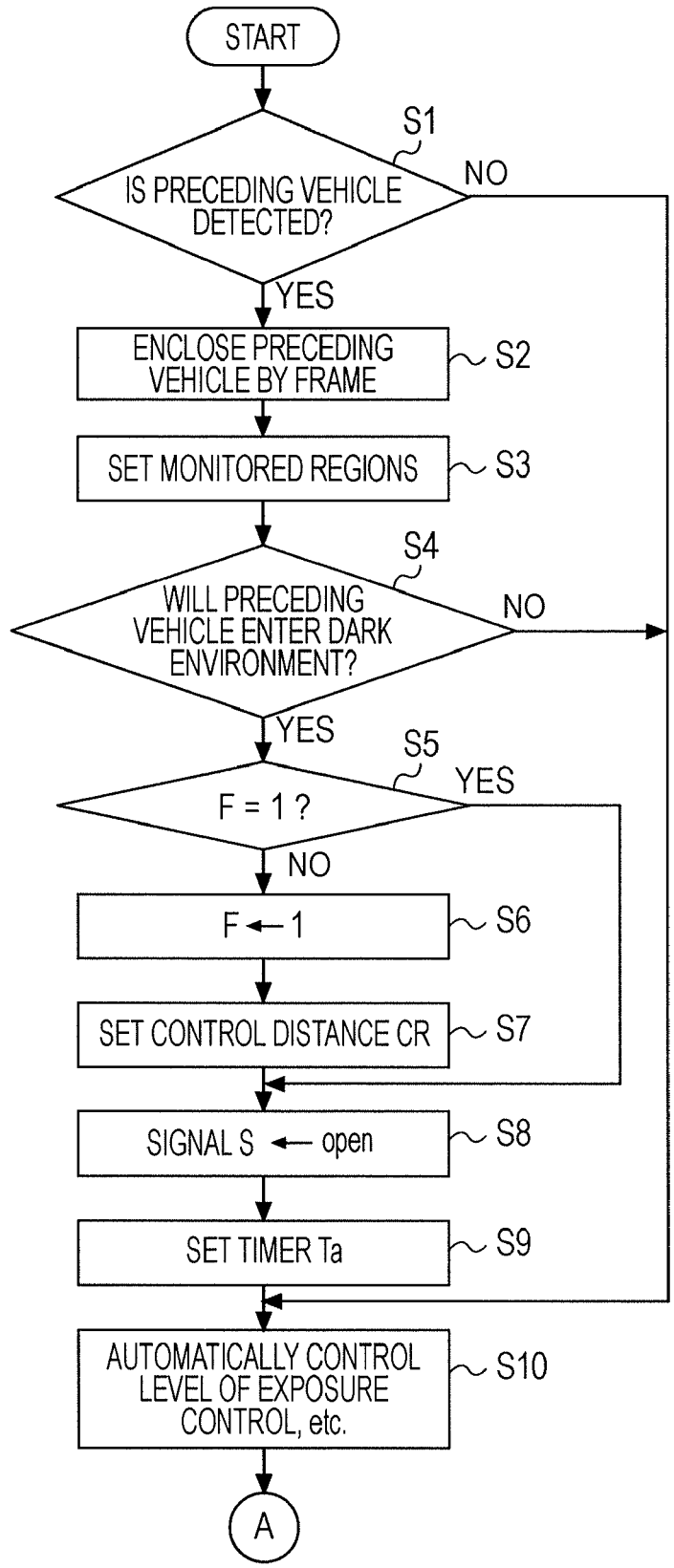
FIG. 12 is a flowchart showing a procedure performed by a monitoring section in the vehicle surroundings monitoring apparatus according to the embodiment.
Figure 13:
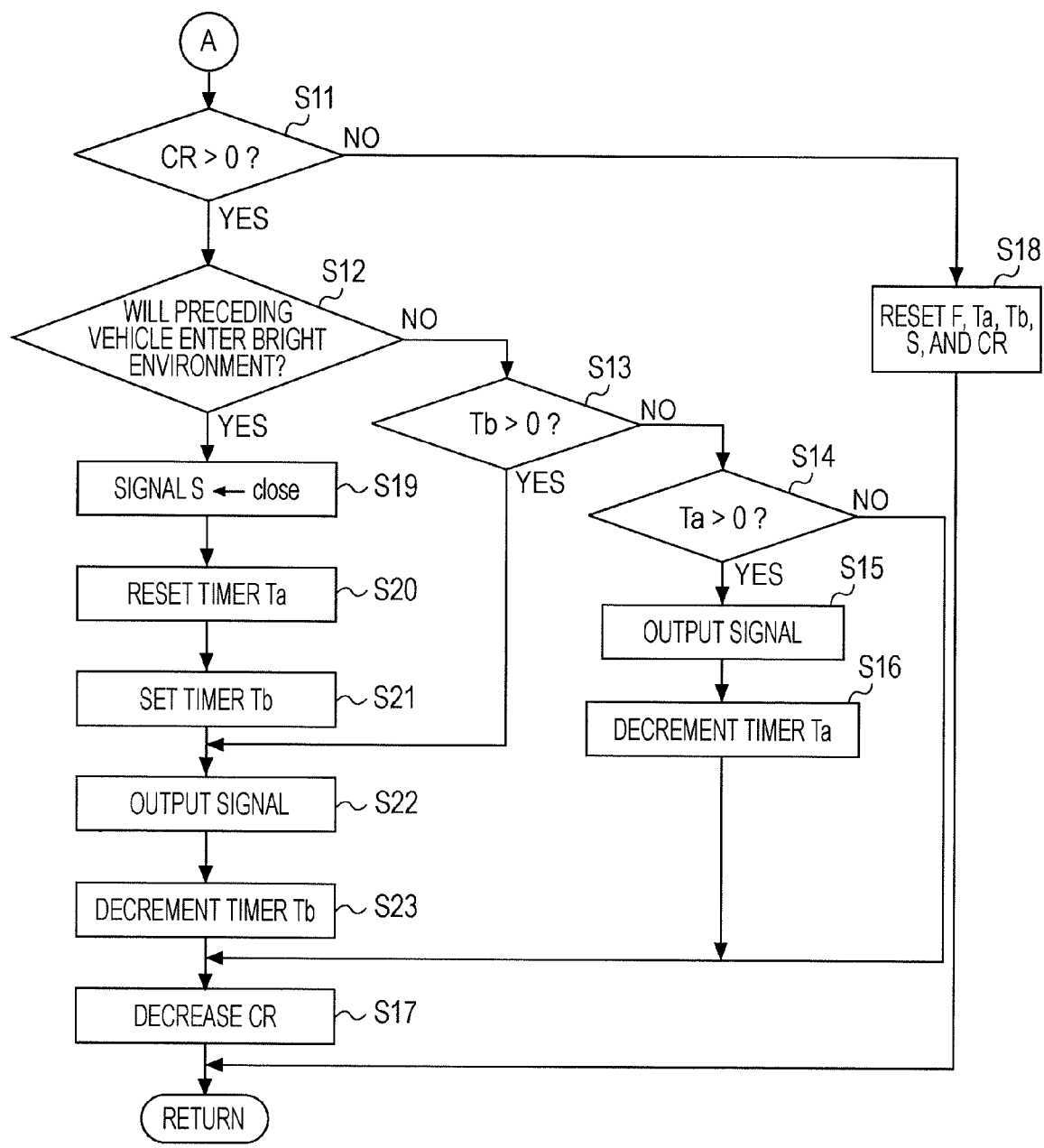
FIG. 13 is a flowchart showing the procedure performed by the monitoring section in the vehicle surroundings monitoring apparatus according to the embodiment.

As shown in FIGS. 12 and 13 serving as flowcharts, while the predicting means 13 is predicting that the preceding vehicle Vah is going to enter a dark environment (Step S4 in FIG. 12; YES), counting of the timer Ta continues. At the time when the predicting means 13 predicts that the preceding vehicle Vah is not going to enter the dark environment (Step S4; NO), the value of the timer Ta starts to decrement from the latest value, as will be described below.

The adjusting means 14 calculates the distance Z between the vehicle A and the preceding vehicle Vah by the above-described expression (3), and divides the distance Z by the vehicle speed V of the vehicle A input from the vehicle speed sensor, thus calculating the time taken for the vehicle A to reach the current position of the preceding vehicle Vah. The adjusting means 14 sets, as the value of the timer Ta, a value corresponding to a time beyond the calculated time from the present time. In this embodiment, the adjusting means 14 sets, as the value of the timer Ta, a sampling frequency corresponding to the sum of the calculated time and about two to three seconds.

Subsequently, the image pickup means 2 checks the brightness around the vehicle A, and determines the level of control such as control of the shutter speed, switching of the amplifier gain, selection of a LUT, and brightness conversion (Step S10). This control is not exposure control forcibly performed by the monitoring means 10, but is automatically performed by the image pickup means 2 in normal cases. This control also provides a criterion of forced exposure control.

Figure 15:
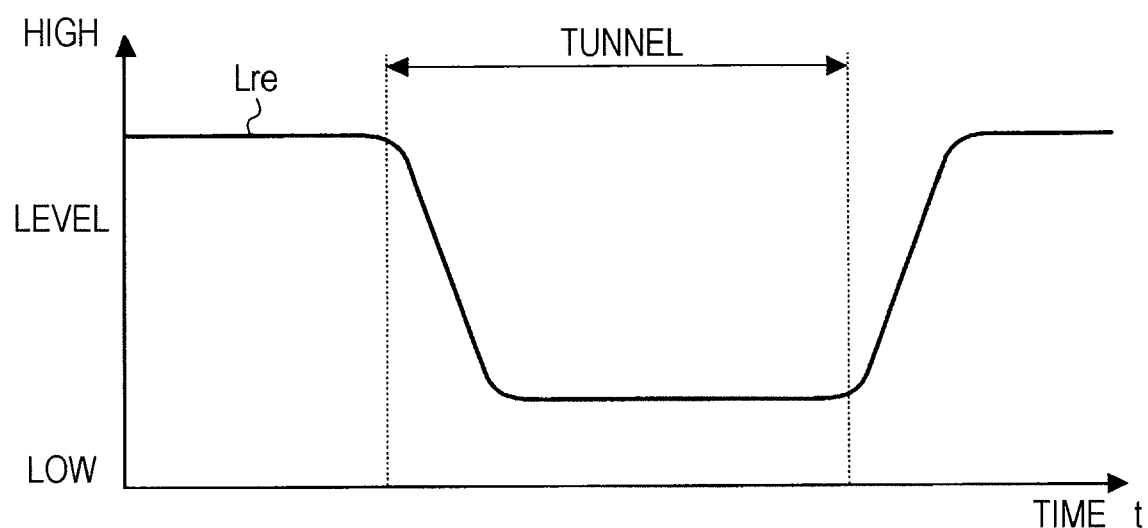
FIG. 15 is a graph showing the level of exposure control automatically set by an image pickup means.

For example, when the vehicle A enters the tunnel Tu and then comes out of the tunnel Tu, a level Lre of this automatic exposure control is normally lowered in a dark environment like the inside of the tunnel Tu and is raised in a bright environment on the entrance side or exit side of the tunnel tu, as shown in FIG. 15.

When the control distance CR is more than 0 (Step S11 in FIG. 13; YES), the adjusting means 14 causes the predicting means 13 to determine whether the counted number of pixels having brightnesses higher than the bright threshold value br_th2 is larger than or equal to the preset threshold value th2 in each of the monitored regions P1 to P5, and to thereby determine whether the preceding vehicle Vah is going to enter a bright environment (Step S12). As described above, determination may be made for the ratio of the number of pixels having brightnesses higher than the bright threshold value br_th2 to the total number of pixels in the monitored region.

In the condition shown in FIG. 14, it is not determined that the preceding vehicle Vah is going to enter a bright environment (Step S12 in FIG. 13; NO). Therefore, the adjusting means 14 determines whether the value of the timer Tb is more than 0 (Step S13). A description of the timer Tb will be given below. In the state shown in FIG. 14, the timer Tb remains in the initial state, that is, the count value of the timer Tb is 0 (Step S13 in FIG. 13; NO).

Then, the adjusting means 14 determines whether the value of the time Ta is more than 0 (Step S14). When the value of the timer Ta thus set, as described above, is more than 0 (Step S14; YES), the open signal S is output to the image pickup means 2 (Step S15), and the value of the timer Ta is decremented by only one (Step S16). When the value of the timer Ta is less than or equal to 0 (Step S14; NO), a signal S for exerting forced control on the image pickup means 2 is not output.

Figure 16:
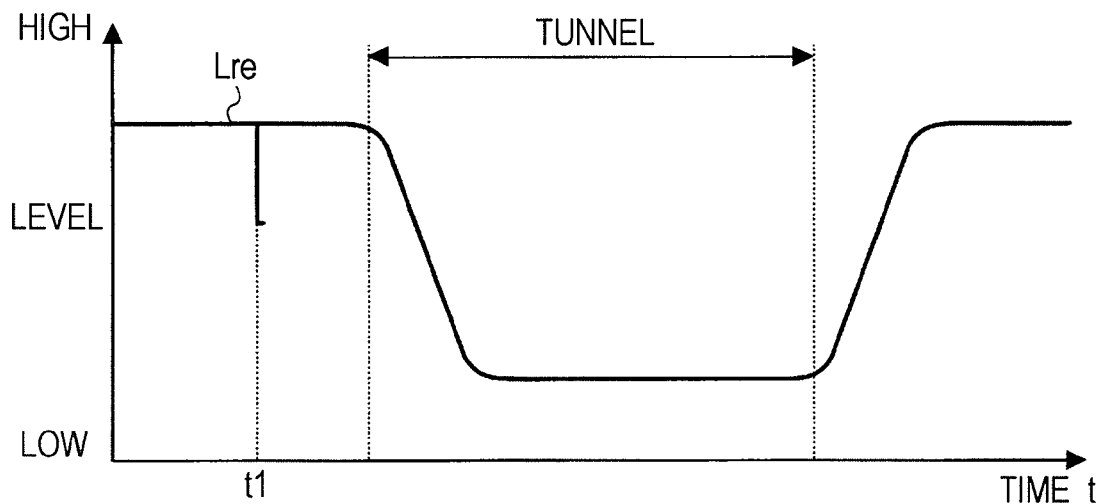
FIG. 16 is a graph explaining a state in which the level of exposure control by the image pickup means is forcibly lowered by an adjusting means.
Figure 17:
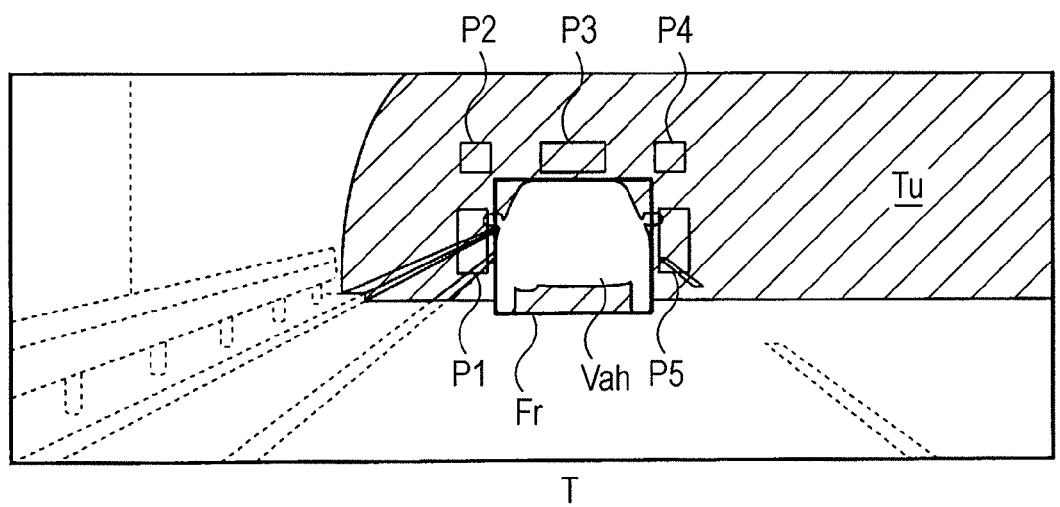
FIG. 17 shows a state in which the control level is forcibly lowered, the brightness of a dark area in the tunnel is increased, and the contrast is increased.

According to the open signal S output from the adjusting means 14, the image pickup means 2 forcibly lowers the level of exposure control, such as control of the shutter speed and switching of the amplifier gain, selection of a LUT, and brightness conversion, for the next sampling period at a time $t_1$ before the preceding vehicle Vah reaches the tunnel Tu, as shown in FIG. 16. For this reason, on a reference image T taken in the next sampling period, as shown in FIG. 17, an originally bright area further increases in brightness and decreases in contrast. Conversely, an originally dark area like the inside of the tunnel Tu increases in brightness and contrast. Consequently, it is possible to take images of structures in the tunnel Tu.

In this way, the level Lre of exposure control and the like automatically determined by the image pickup means 2 in each sampling period (Step S10 in FIG. 12) is forcibly lowered to a level Lco (Step S15 in FIG. 13) in response to the output of the open signal S to the image pickup means 2. This operation is continued while the predicting means 13 is predicting that the preceding vehicle Vah is going to enter a dark environment (Step S4 in FIG. 12; YES) and the value of the timer Ta is more than 0 after that (Step S14 in FIG. 13; YES), as shown in FIG. 18.

Figure 19:
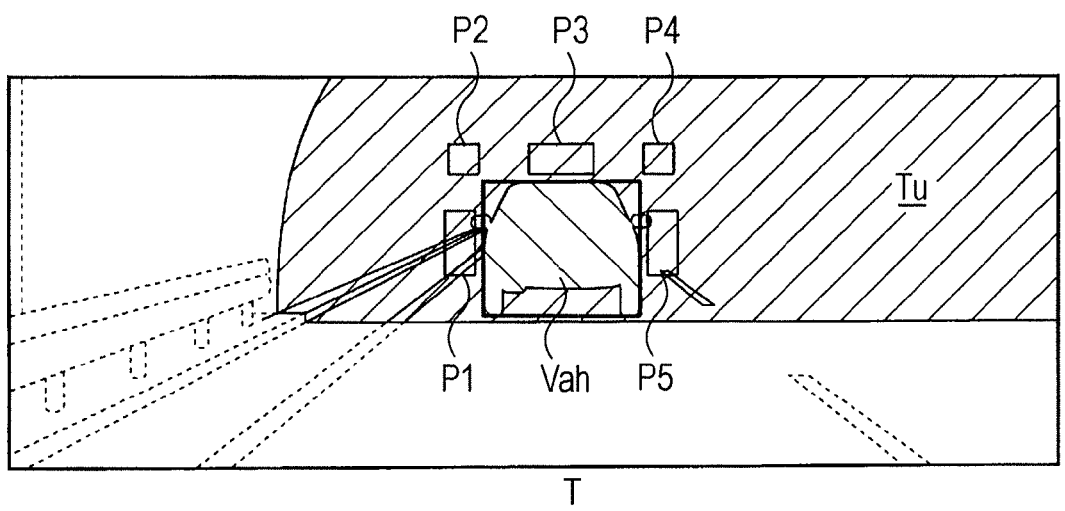
FIG. 19 shows the preceding vehicle that is detected even after entering the dark tunnel.

For this reason, even when the preceding vehicle Vah enters the tunnel Tu, the brightness of the environment greatly changes, and the brightness of the preceding vehicle Vah itself decreases, as shown in FIG. 19, the preceding vehicle Vah can be detected as distinct from the surroundings.

Figure 18:
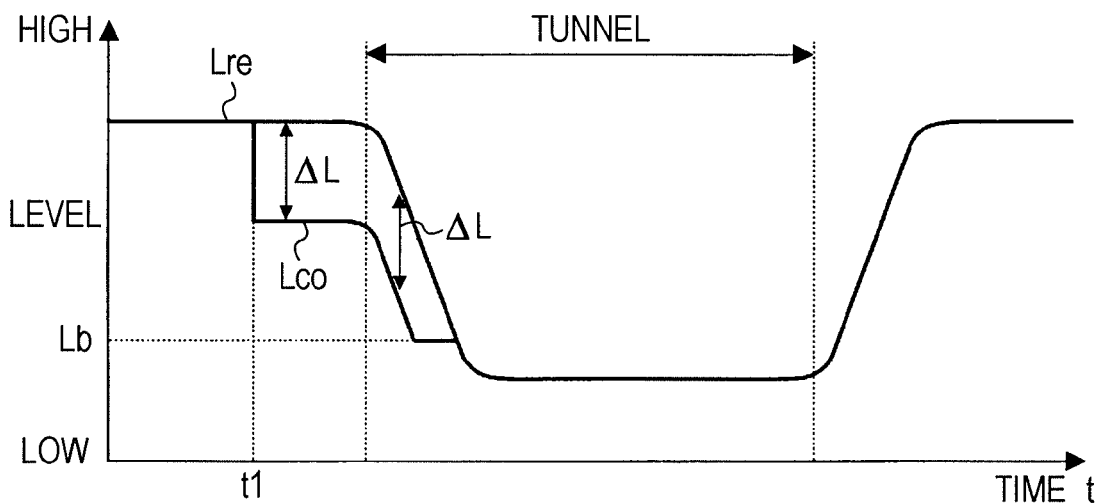
FIG. 18 is a graph explaining a state in which a process for forcibly lowering the control level is continued.

In this embodiment, the image pickup means 2 lowers the level of exposure control and the like from Lre to Lco by ΔL at once in response to the open signal S from the adjusting means 14, as shown in FIG. 18. Alternatively, for example, the level may be lowered stepwise in the sampling periods. In this embodiment, the level of exposure control and the like is lowered by forced control so as not to fall below a predetermined level Lb.

After the above operations, the adjusting means 14 decreases the control distance CR (Step S17). In this embodiment, the adjusting means 14 calculates the distance for which the vehicle A has moved in the current sampling period, by multiplying the vehicle speed V of the vehicle A by the time corresponding to the sampling period, and subtracts the calculated distance from the control distance CR read from the memory. The control distance from which the calculated distance is subtracted is stored as a new control distance CR in the memory.

In this way, the control distance CR sets an upper limit for determining the duration of forced control on the basis of the traveling distance of the vehicle A. By setting the control distance CR, forced control can be prevented from being continued endlessly. Accordingly, the control distance CR is set at, for example, 10 km in this embodiment, as described above. The flag F is set to prevent the control distance CR from being substantially extended by being reset in each sampling period (Step S5 in FIG. 12; YES).

When the control distance CR becomes less than or equal to 0 (Step S11 in FIG. 13; NO) and it is proved that forced control has been continued while the vehicle A has run by the control distance CR, the adjusting means 14 resets all the flag F, the timers Ta and Tb, the signal S, and the control distance CR (Step S18), and returns the image pickup means 2 into a normal automatic control state in which any forced control is not performed. Consequently, the image pickup means 2 returns to a state such as to determine the level Lre of exposure control and the like by checking the brightness around the vehicle A by itself.

Figure 20:
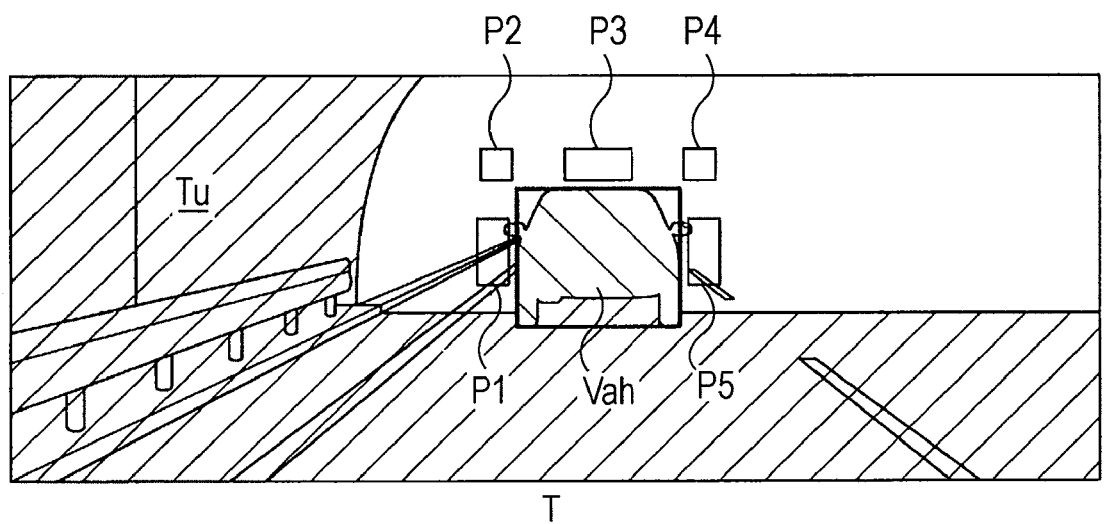
FIG. 20 shows the preceding vehicle reaching the exit of the tunnel and monitored regions.

For example, when the vehicle A is arriving at the exit of the tunnel Tu, an image of the preceding vehicle Vah is taken against the background of the exit of the tunnel Tu, as in a reference image T shown in FIG. 20. Then, when the predicting means 13 determines that the counted number of pixels having brightnesses higher than the bright threshold value br_th2 is larger than or equal to the preset threshold value th2 in each of the monitored regions P1 to P5 and predicts that the preceding vehicle Vah is going to enter a bright environment (Step S12 in FIG. 13; YES), the adjusting means 14 sets a close signal as a signal S to be output to the image pickup means 2 (Step S19).

Then, the adjusting means 14 resets the timer Ta for a dark environment (Step S20), and sets the timer Tb for a bright environment (Step S21). Similarly to the above-described timer Ta, a sampling frequency corresponding to the sum of the time needed for the vehicle A to reach the present position of the preceding vehicle Vah, and a time of about 2 to 3 seconds is set as the value of the timer Tb. The time needed for the vehicle A to reach the present position of the preceding vehicle Vah is calculated from the distance Z between the vehicle A and the preceding vehicle Vah and the vehicle speed V of the vehicle A.

Subsequently, the adjusting means 14 outputs the close signal S to the image pickup means 2 (Step S22), and decrements the value of the timer Tb by only one (Step S23). Even when the predicting means 13 does not predict in Step S12 that the preceding vehicle Vah is going to enter a bright environment (Step S12; NO), while the value of the timer Tb is more than 0 (Step S13; YES), the adjusting means 14 continues the output of the close signal S to the image pickup means 2 (Step S22) and the decrement of the timer Tb (Step S23).

Figure 21:
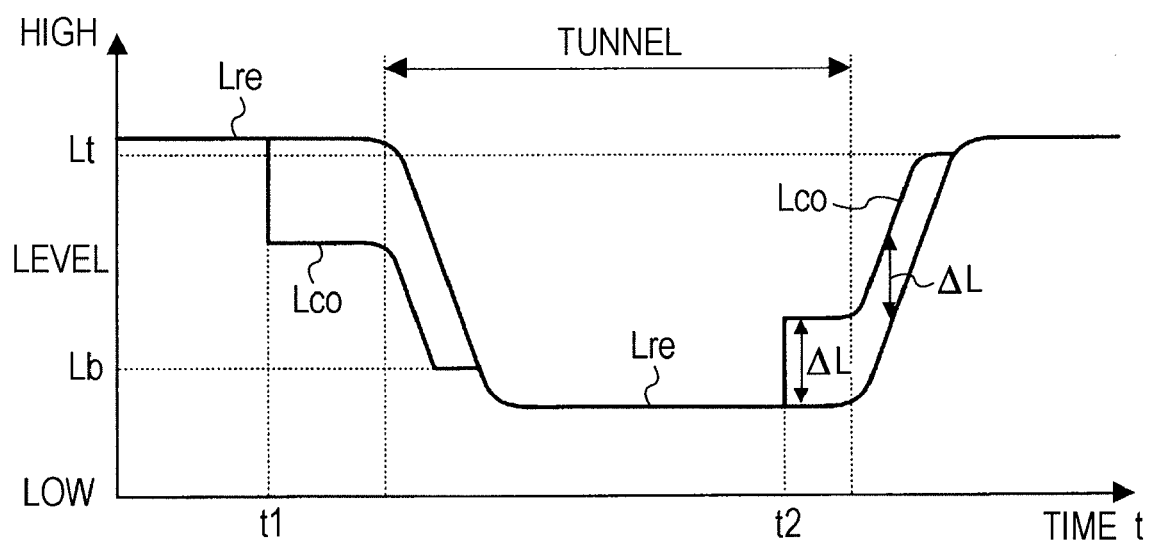
FIG. 21 is a graph explaining a state in which the forced change of the control level is continued.
Figure 22:
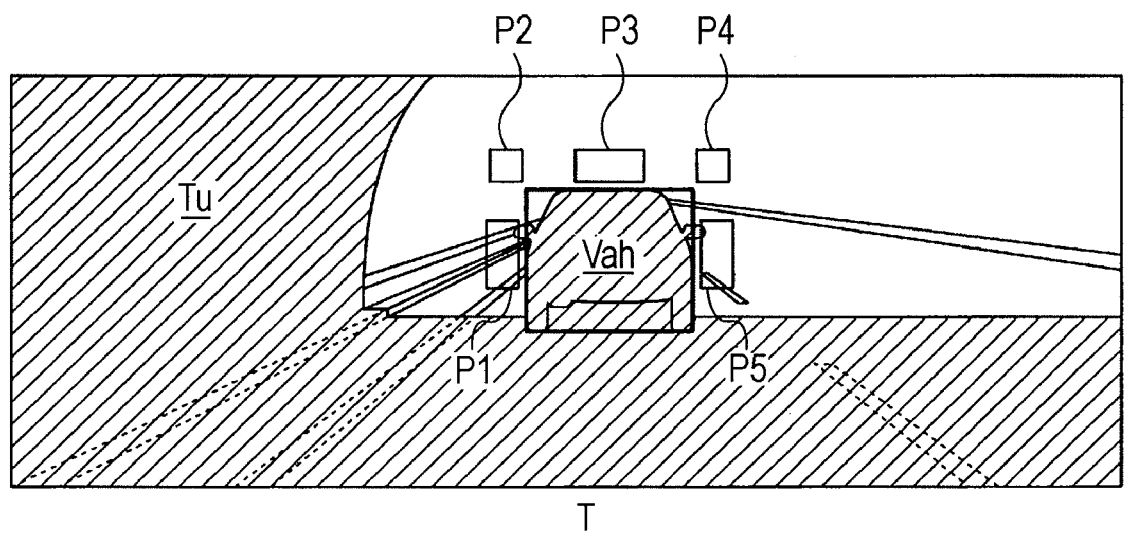
FIG. 22 shows a state in which the control level is forcibly increased, the brightness of a bright area outside the tunnel is lowered, and the contrast is improved.

According to the close signal S output from the adjusting means 14, the image pickup means 2 raises the control level for exposure control, such as control of the shutter speed and switching of the amplifier gain, selection of a LUT, and brightness conversion for the next sampling period at a time $t_2$ before the preceding vehicle Vah reaches the exit of the tunnel Tu, as shown in FIG. 21. For this reason, on a reference image T taken in the next sampling period, as shown in FIG. 22, an originally dark area further decreases in brightness and decreases in contrast. Conversely, an originally bright area like the outside of the tunnel Tu decreases in brightness and increases in contrast as a whole. This allows an image of the outside of the tunnel Tu to be taken in high contrast.

Figure 23:
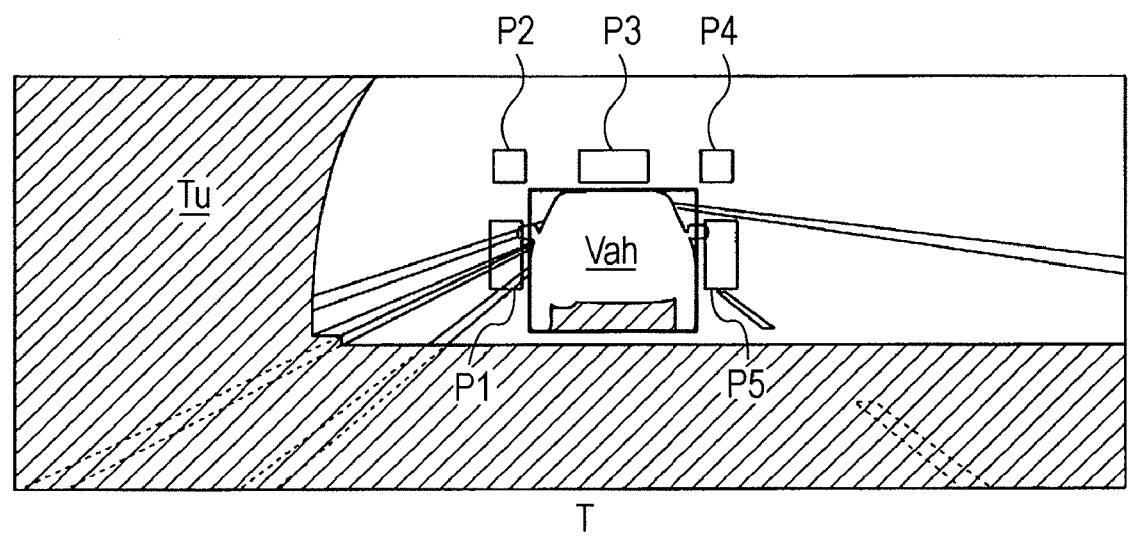
FIG. 23 shows the preceding vehicle that is detected after entering a bright area outside the tunnel.

While the preceding vehicle Vah itself becomes dark in this case, it can be reliably detected, because a boundary between the preceding vehicle Vah and the surrounding bright background is clear. Further, since the contrast is improved outside the tunnel Tu, even when the preceding vehicle Vah comes out of the tunnel Tu, the ambient brightness greatly changes, and the brightness of the preceding vehicle Vah itself increases, as shown in FIG. 23, the preceding vehicle Vah can be detected as distinct from the surroundings.

Instead of being raised by ΔL at once in response to the open signal S from the adjusting means 14, as shown in FIG. 21, the control level for exposure control and the like may be raised stepwise in the sampling periods. In this embodiment, the control level is set so as not to be raised above a predetermined level Lt by forced control.

After the above operations, the adjusting means 14 decreases the control distance CR (Step S17). Decreasing is performed in the above-described manner.

As described above, according to the vehicle surroundings monitoring apparatus 1 of this embodiment, the predicting means 13 predicts the brightness of an environment that the preceding vehicle Vah is going to enter, on the basis of the brightnesses of pixels in the monitored regions P1 to P5 set around the preceding vehicle Vah on the reference image T and including an area in front of the preceding vehicle Vah. When it is predicted that the preceding vehicle Vah is going to go from a bright environment into a dark environment, for example, the preceding vehicle Vah is going to enter the tunnel Tu, the control level for exposure of the image pickup means 2 and pixel brightness output from the image pickup means 2 is forcibly changed to a control level for a dark environment beforehand.

By thus forcibly changing the control level for the exposure and brightness of the output image from the control level automatically determined by the image pickup means 2, the contrast of the dark area in the reference image T is improved. Even when the preceding vehicle Vah enters a dark environment, it can be reliably detected as distinct from the surroundings.

Conversely, when it is predicted that the preceding vehicle Vah is going to go from a dark environment into a bright environment, for example, the preceding vehicle Vah is going to come out of the tunnel Tu, the control level for exposure of the image pickup means 2 and pixel brightness output from the image pickup means 2 is forcibly changed to a control level for a bright environment beforehand. By thus forcibly changing the control level for the exposure and brightness of the output image, the contrast of the bright area in the reference image T is improved. Even when the preceding vehicle Vah goes from a dark environment into a bright environment, it can be reliably detected as distinct from the surroundings.

Unless the predicting means 13 predicts that the preceding vehicle Vah is going to go from a bright environment into a dark environment or from a dark environment into a bright environment, the above-described forced change of the control level for the exposure and output image brightness is not performed. For this reason, except when the brightness of the environment the preceding vehicle Vah is going to enter greatly changes, the control level is not forcibly changed, and images can be taken with a proper exposure amount based on the control level determined by the image pickup means 2. Therefore, automatic control can be exerted so that objects different from the preceding vehicle are prevented from being erroneously detected by forcibly changing the control level in an unnecessary case.

While the control level is forcibly changed in both the case in which the preceding vehicle Vah goes from a bright environment into a dark environment and the case in which the preceding vehicle Vah goes from a dark environment into a bright environment in this embodiment, the change does not always need to be performed in both cases. For example, when an image of the preceding vehicle Vah moving in a bright environment is taken in a state in which the vehicle A is moving in a dark environment like the inside of the tunnel Tu, if the preceding vehicle Vah can be sufficiently reliably detected without forcibly changing the control level, forced change may be omitted at least when the preceding vehicle Vah goes from the dark environment into the bright environment.

As shown in FIGS. 12 and 13 serving as flowcharts, when it is predicted that the preceding vehicle Vah is going to enter a dark environment (Step S4 in FIG. 12; YES), the control distance CR is set (Step S7). Only when the control distance CR is larger than 0 (Step S11 in FIG. 13; YES), it is predicted whether the preceding vehicle Vah is going to enter a bright environment (Step S12). Therefore, after the adjusting means 14 exerts forced control for a dark environment at the time when the predicting means 13 predicts that the preceding vehicle Vah is going to enter the dark environment, it exerts forced control for a bright environment at the time when the predicting means 13 predicts that the preceding vehicle Vah is going to enter the bright environment.

As necessary, in accordance with the structures of the image pickup means 2 and the image correcting unit 4 mounted in the vehicle, the control level can be forcibly changed when the preceding vehicle goes from a bright environment into a dark environment, when the preceding vehicle goes from a dark environment into a bright environment, or in both cases.

The frame enclosing the detected preceding vehicle can be utilized. For example, a region in the frame can also be set as a monitored region, and the brightness of the preceding vehicle can be predicted on the basis of the average brightness of pixels in the monitored region shown by the frame and including the preceding vehicle and the mode of a histogram representing the pixel brightnesses. In this case, the adjusting means 14 can determine whether to forcibly control the exposure amount of the image pickup means 2 and the pixel brightness output from the image pickup means 2 beforehand, with consideration of not only the brightness of the environment the preceding vehicle is going to enter, which is predicted on the basis of the brightnesses of the pixels in the monitored regions P1 to P5 around the preceding vehicle except the monitored region including the preceding vehicle, but also the brightness of the preceding vehicle itself.

In other words, for example, even if it becomes dark around the preceding vehicle and it is predicted that the preceding vehicle is going to enter a dark environment, when the preceding vehicle itself is bright enough to be distinguished from the dark surroundings, the control level for exposure amount of the image pickup means 2 and pixel brightness output from the image pickup means 2 does not always need to be forcibly changed to a control level for a dark environment beforehand. In this case, for example, a standby mode may be selected at the time when it is predicted that the preceding vehicle is going to enter a dark environment, and forced change of the control level may be started at the time when the preceding vehicle itself becomes dark and is not easily distinguished from the dark surroundings.

In the above-described case, it is possible to more accurately provide the advantages of the vehicle surroundings monitoring apparatus 1 of this embodiment, that is, to reliably detect the preceding vehicle as distinct from the dark and bright surroundings and to prevent forced change of the control level from being made unnecessarily.

What is claimed is:

1. A vehicle surroundings monitoring apparatus comprising:
    image pickup means for taking an image of the surroundings of a vehicle in which the vehicle surroundings monitoring apparatus is mounted;
    preceding-vehicle detecting means for detecting a preceding vehicle from the taken image;
    monitored-region setting means for setting at least one predetermined monitored region around the preceding vehicle on the image;
    predicting means for predicting a brightness of an environment the preceding vehicle is going to enter, on the basis of brightnesses of pixels in the monitored region; and
    adjusting means for adjusting at least one of an exposure amount of the image pickup means and the brightnesses of the pixels output from the image pickup means beforehand in accordance with the brightness of the environment predicted by the predicting means.

2. The vehicle surroundings monitoring apparatus according to claim 1, wherein the at least one predetermined monitored region includes a plurality of monitored regions.

3. The vehicle surroundings monitoring apparatus according to claim 2, wherein the plurality of monitored regions are set at least on upper, right, and left sides of the preceding vehicle on the image.

4. The vehicle surroundings monitoring apparatus according to claim 1, wherein the predicting means predicts that the preceding vehicle is going to enter a dark environment when the brightness of the environment is less than a preset dark threshold value.

5. The vehicle surroundings monitoring apparatus according to claim 4, wherein the predicting means predicts that the preceding vehicle is going to enter the dark environment when the brightness of the environment is less than the preset dark threshold value in at least a predetermined number of monitored regions of the at least one predetermined monitored region.

6. The vehicle surroundings monitoring apparatus according to claim 1, wherein the predicting means predicts that the preceding vehicle is going to enter a bright environment when the brightness of the environment is more than a preset bright threshold value.

7. The vehicle surroundings monitoring apparatus according to claim 6, wherein the predicting means predicts that the preceding vehicle is going to enter the bright environment when the brightness of the environment is more than the preset bright threshold value in at least a predetermined number of monitored regions of the at least one predetermined monitored region.

8. The vehicle surroundings monitoring apparatus according to claim 1, wherein the adjusting means makes the adjustment for a dark environment when the predicting means predicts that the preceding vehicle is going to enter the dark environment, and subsequently makes the adjustment for a bright environment when the predicting means predicts that the preceding vehicle is going to enter the bright environment.

9. The vehicle surroundings monitoring apparatus according to claim 1, wherein the adjusting means makes the adjustment until the vehicle passes a current position of the preceding vehicle on the basis of a distance between the vehicle and the preceding vehicle and a speed of the vehicle when the predicting means predicts that the preceding vehicle is going to enter a dark environment or a bright environment.

10. The vehicle surroundings monitoring apparatus according to claim 1,
    wherein the at least one predetermined monitored region includes a region including the preceding vehicle on the image,
    wherein the predicting means predicts a brightness of the preceding vehicle on the basis of brightnesses of pixels in the region including the preceding vehicle, and
    wherein the adjusting means makes the adjustment in accordance with the brightness of the environment predicted by the predicting means and the brightness of the preceding vehicle.

11. A vehicle surroundings monitoring apparatus comprising:
    image pickup means configured to take an image of the surroundings of a vehicle in which the vehicle surroundings monitoring apparatus is mounted;
    preceding-vehicle detecting means configured to detect a preceding vehicle from the taken image;
    monitored-region setting means configured to set at least one predetermined monitored region around the preceding vehicle on the image;
    predicting means configured to predict a brightness of an environment the preceding vehicle is going to enter, on the basis of brightnesses of pixels in the monitored region; and
    adjusting means configured to adjust at least one of an exposure amount of the image pickup means and the brightnesses of the pixels output from the image pickup means beforehand in accordance with the brightness of the environment predicted by the predicting means.

* * * * *